(12) United States Patent
Salonidis et al.

(10) Patent No.: US 9,281,887 B2
(45) Date of Patent: Mar. 8, 2016

(54) METHOD FOR TOPOLOGY CONTROL USING SECTORIZED ANTENNAS IN WIRELESS NETWORKS

(75) Inventors: Theodoros Salonidis, Paris (FR); Anand Prabhu Subramanian, New Providence, NJ (US); Henrik Lundgren, Le Plessis Robinson (FR); Don Towsley, Amherst, MA (US)

(73) Assignee: Thomson Licensing, Issy-les-Moulineaux (FR)

( * ) Notice: Subject to any disclaimer, the term of this patent is extended or adjusted under 35 U.S.C. 154(b) by 61 days.

(21) Appl. No.: 13/500,475

(22) PCT Filed: Oct. 8, 2010

(86) PCT No.: PCT/EP2010/065088
§ 371 (c)(1),
(2), (4) Date: Apr. 5, 2012

(87) PCT Pub. No.: WO2011/042536
PCT Pub. Date: Apr. 14, 2011

(65) Prior Publication Data
US 2012/0202432 A1 Aug. 9, 2012

(30) Foreign Application Priority Data
Oct. 8, 2009 (EP) .................................. 09305956

(51) Int. Cl.
*H04M 11/04* (2006.01)
*H04B 7/04* (2006.01)
(Continued)

(52) U.S. Cl.
CPC ............ *H04B 7/0491* (2013.01); *H04W 72/085* (2013.01); *H04W 72/0406* (2013.01); *H04W 84/12* (2013.01); *H04W 84/18* (2013.01)
USPC ..................... 455/562.1; 455/560; 455/575.7; 342/372

(58) Field of Classification Search
CPC ...... H04M 11/04; H04W 4/22; H04W 76/007
USPC ........... 455/562.1, 560, 575.7, 436, 446, 428, 455/435.2, 525; 342/372, 373
See application file for complete search history.

(56) References Cited

U.S. PATENT DOCUMENTS 6,011,515 A * 1/2000 Radcliffe et al. .............. 342/453
6,486,828 B1 * 11/2002 Cahn et al. .................... 342/363
(Continued)

FOREIGN PATENT DOCUMENTS

EP 1569361 8/2005
GB 2311912 10/1997
(Continued)

OTHER PUBLICATIONS

Tang etal: "Interference-aware routing in multihop wireless networks using directional antennas" 24th Annual Joint Conf. of the IEEE, vol. 1. Mar. 13, 2005, p. 751-760.
(Continued)

*Primary Examiner* — Minh D Dao
(74) *Attorney, Agent, or Firm* — Myers Wolin LLC (57) ABSTRACT

The invention concerns a method for optimizing antenna pattern assignment for a first wireless communication device forming a wireless network with at least one second wireless communication device, each of said communication device being equipped with a multi-sector antenna, an antenna pattern being a combination of said antenna sectors, said communication devices being adapted for sending a request and for receiving a response using a current antenna pattern assignment, said method comprising a step of:

evaluating by said first communication device a first value;
sending by said first communication device to said second communication device a broadcast request comprising said value
receiving by said first communication device, a response to said broadcast request, said response being sent by said second communication device, said response depending on a second value evaluated by said second device;
Switching or not, by said first communication device, to a new antenna sector assignment depending on said response;
According to the invention the first value is evaluated by minimizing a first local function according to the received signal strength received by said first communication device having said current antenna pattern assignment and the second value is evaluated by minimizing a second local function according to the received signal strength received by said second communication device for its own current antenna pattern assignment.

28 Claims, 1 Drawing Sheet

(51) Int. Cl.
*H04W 72/08* (2009.01)
*H04W 84/12* (2009.01)
*H04W 72/04* (2009.01)
*H04W 84/18* (2009.01)

(56) References Cited

U.S. PATENT DOCUMENTS

| | | | | |
|---|---|---|---|---|
| 6,700,542 | B2 * | 3/2004 | Borlez et al. | 343/700 MS |
| 7,129,892 | B2 * | 10/2006 | Borlez et al. | 343/700 MS |
| 7,221,318 | B2 * | 5/2007 | Chang et al. | 342/372 |
| 7,421,321 | B2 * | 9/2008 | Breed et al. | 701/33.6 |
| 7,567,543 | B2 | 7/2009 | Cao et al. | |
| 7,848,769 | B2 * | 12/2010 | Fuller et al. | 455/521 |
| 8,078,210 | B2 * | 12/2011 | Fuller et al. | 455/521 |
| 2001/0055948 | A1 * | 12/2001 | Ikeda et al. | 455/13.3 |
| 2002/0160716 | A1 * | 10/2002 | Hiramatsu et al. | 455/67.1 |
| 2003/0129992 | A1 | 7/2003 | Koorapaty et al. | |
| 2004/0127163 | A1 | 7/2004 | Schramm et al. | |
| 2004/0196813 | A1 | 10/2004 | Ofek et al. | |
| 2004/0220753 | A1 * | 11/2004 | Tabe | 702/32 |
| 2005/0273218 | A1 * | 12/2005 | Breed et al. | 701/2 |
| 2007/0111757 | A1 | 5/2007 | Cao et al. | |
| 2007/0123257 | A1 * | 5/2007 | Noll et al. | 455/436 |
| 2008/0207194 | A1 | 8/2008 | Chae et al. | |
| 2008/0299927 | A1 | 12/2008 | Tenbrook | |
| 2009/0005083 | A1 * | 1/2009 | Hoshino et al. | 455/456.5 |
| 2009/0247182 | A1 * | 10/2009 | Tamate | 455/452.2 |
| 2010/0035653 | A1 * | 2/2010 | Chang et al. | 455/561 |
| 2013/0010749 | A1 * | 1/2013 | Chang et al. | 370/330 |
| 2013/0267195 | A1 * | 10/2013 | Fuller et al. | 455/404.2 |

FOREIGN PATENT DOCUMENTS

| | | |
|---|---|---|
| GB | 2422516 | 7/2006 |
| WO | WO2009062427 | 5/2009 |

OTHER PUBLICATIONS

Dai et al: "An Overview of MAC Protocols with Directional Antennas in Wireless ad hoc Networks", Computing in the Global Info Tech., IEEE, Jul. 1, 2006, p. 84.

Sundaresan et al: "Algorithmic Aspects of Communication in Ad-hoc Networks with Smart Antennas", May 25, 2006, p. 1-12.

Subramanian et al: Topology Control Protocol Using Sectorized Antennas in Dense 802.11 Wireless Networks, Oct. 13, 2009, pp. 1-10.

European Search Report Mar. 17, 2010.

International Search Report Nov. 24, 2010.

Blanco et al. "On the Effectiveness of Switched Beam Antennas in Indoor Environments", In Proc. PAM, Apr. 2008.

Sundaresan et al, "Algorithmic Aspects of Communication in Ad-hoc Networks with Smart Antennas", MobiHoc'06, May 22-25, 2006, Florence.

Kumar et al. "A Topology Control Approach to Using Directional Antennas in Wireless Mesh Networks", IEEE 2006.

Huang et al. "Multibeam Antenna-Based Topology Controi with Directional Power Intensity for Ad Hoc Networks", IEEE, vol. 5, May 2006.

Huang et al, "Topology Control for Ad hoc Networks with Directional Antennas", IEEE, 2002.

Choudhury et al. "Deafness: A MAC Problem in Ad Hoc Networks when using Directional Antennas", IEEE, Oct. 2004.

Choudhury et al. "Using Directional Antennas for Medium Access Control in Ad Hoc Networks", MOBICOM'02, Sep. 23-28, 2002, Atlanta, Georgia.

Ko et al. "Medium Access Control Protocols Using Directional Antennas in Ad Hoc Netvvorks" in Proc. ACM MobiCom, Sep. 2002.

Subramanian et al. "Experimental Characterization of Sectorized Antennas in Dense 802.11 Wireless Mesh Networks", MobiHoc'09, May 18-21, 2009, New Orleans, L.A.

Anonymous, "How it works: Fon", http://corp.fon.com/en/how-it-works; Aug. 9, 2009, pp. 1-4.

* cited by examiner

METHOD FOR TOPOLOGY CONTROL USING SECTORIZED ANTENNAS IN WIRELESS NETWORKS

This application claims the benefit, under 35 U.S.C. §365 of International Application PCT/EP2010/065088, filed Oct. 8, 2010, which was published in accordance with PCT Article 21(2) on Apr. 14, 2011 in English and which claims the benefit of European patent application No. 09305956.6, filed Oct. 8, 2009.

FIELD OF THE INVENTION

The present invention pertains to the field of communication networks.

The present invention more particularly relates to a method for topology control using sectorized antennas in wireless networks.

BACKGROUND OF THE INVENTION

Recently, wireless (cellular, 802.11 wireless LANs, etc) networks have gained significant interest due to potential high data rate connectivity, very low deployment cost, and free or low-cost network access to users. Several enterprises and universities have deployed large scale wireless networks to service a number of users.

Numerous urban areas are already covered with dense deployments of wireless networks and efforts to form community mesh networks using them are under way (FON WiFi Community. http://www.fon.com/en/.).

Wireless networks and in particular IEEE 802.11 networks, however, suffer from serious interference problems limiting their capacity due to the broadcast nature of the wireless medium and their use of the unlicensed spectrum band. Sectorized antennas are attractive solutions to reduce wireless interference through higher spatial reuse. They can concentrate radio signal energy in a particular direction, instead of radiating it in all directions like their omni-directional counterpart. There exist primarily two approaches to exploit directional communication in wireless networks: directional MAC protocols and topology control protocols. Directional MAC protocols (R. Choudhury and N. H. Vaidya. "*Deafness: A Mac Problem in Ad Hoc Networks when using Directional Antennas*." In Proc. IEEE ICNP, October 2004— and Y. Ko, V. Shankarkumar, and N. H. Vaidya. "Medium Access Control Protocols Using Directional Antennas in Ad Hoc Networks". In Proc. IEEE INFOCOM, March 2000) aim to achieve higher spatial reuse by switching between different sectors to communicate to different neighbors at a very fast (per-packet) time scale. They also require modifications to the IEEE 802.11 MAC protocol to combat deafness and directional hidden terminal problem (R. Choudhury, X. Yang, R. Ramanathan, and N. H Vaidya. "*Using Directional Antennas for Medium Access Control in Ad Hoc Networks*" In Proc. ACM MobiCom, September 2002). On the other hand, topology control protocols (Z. Huang, C. Shen, C. Srisathapornphat, and C. Jaikaeo. "*Topology Control for Ad hoc Networks with Directional Antennas*" In IEEE Int. Conference on Computer Communications and Networks, 2002.—Zhuochuan Huang and Chien-Chung Shen. "*Multibeam Antenna-based Topology Control with Directional Power Intensity for Ad Hoc Networks*" 5(5), 2006—U. Kumar, H. Gupta, and S. R. Das. "*A Topology Control Approach to using Directional Antennas in Wireless Mesh Networks*" In Proc. ICC, 2006— K. Sundaresan, W. Wang, and S. Eidenbenz. "*Algorithmic Aspects of Communication in Ad-hoc Networks with Smart Antennas*" In Proc. ACM MobiHoc, 2006) activate multiple sectors simultaneously at slower time scales (on the order of minutes or more) at the potential expense of performance without requiring complex modifications to the standard IEEE 802.11 MAC protocol.

All these proposed topology control solutions use simplistic interference model assumptions (such as pairwise interference) and use adaptations of graph theoretic algorithms. They ignore several practical considerations and are evaluated only through simulation studies. On the other hand, recent measurement studies on densely deployed IEEE 802.11 networks (M. Blanco, R. Kokku, K. Ramachandran, S. Rangarajan, and K. Sundaresan. On the Effectiveness of Switched Beam Antennas in Indoor Environments. In In Proc. Passive and Active Measurements Conference (PAM), 2008—A. P. Subramanian, H. Lundgren, and T. Salonidis. "*Experimental Characterization of Sectorized Antennas in Dense* 802.11 *Wireless Mesh Networks*." In Proc. ACM MobiHoc, 2009.) have shown that common design assumptions such as usage of geographically pointing sectors and sector independence on multi-sector activation are sub-optimal in reflection-rich dense deployments. These studies have also investigated the effect of physical layer capture on reducing directional hidden terminal problem and have shown that sectorized antennas can provide higher spatial reuse opportunities. However, these observations have not been translated to practical protocols that can extract the capacity gains of antenna sectorization in real-world dense IEEE 802.11 wireless environments.

A majority of past work on the use of sectorized antennas and topology control in IEEE 802.11 based wireless networks has focused on analytical studies, and protocol design and evaluation through simulations. Kumar et al. (U. Kumar, H. Gupta, and S. R. Das. "*A Topology Control Approach to using Directional Antennas in Wireless Mesh Networks*" In Proc. ICC, 2006) uses an antenna model consisting of multiple single-sector antennas and propose a centralized algorithm to construct a minimum degree spanning tree in a mesh network. Huang et al. (Z. Huang, C. Shen, C. Srisathapornphat, and C. Jaikaeo. "*Topology Control for Ad hoc Networks with Directional Antennas*" In IEEE Int. Conference on Computer Communications and Networks, 2002.—Zhuochuan Huang and Chien-Chung Shen. "*Multibeam Antenna-based Topology Control with Directional Power Intensity for Ad Hoc Networks*" 5(5), 2006) propose two different topology control approaches which use transmission power adjustments and multi-sector antennas. They assume simplified antenna and network interference models, and propose a graph coloring based approach. Finally, Sundaresan et al. (K. Sundaresan, W. Wang, and S. Eidenbenz. "*Algorithmic Aspects of Communication in Ad-hoc Networks with Smart Antennas*" In Proc. ACM MobiHoc, 2006.) consider the problem of determining the (antenna) communication pattern to be used by nodes in a mesh network and formulate it as interference minimization when using "smart antennas" (digital adaptive arrays). All the current approaches for topology control uses idealized antenna models, assume pair-wise interference model, propose solutions based on graph theoretic algorithms, and have only been evaluated through simulations.

SUMMARY OF THE INVENTION

The present invention aims at solving the above-mentioned drawbacks of the prior art solutions.

In contrast to the previous work, the inventors formulate in the present invention a topology control optimization problem based on insights from experimental studies in current literature. The inventors aim to minimize the overall interference in the network. The formulation in the present invention uses physical interference models based on measured received signal strength values, rather than pairwise interference models. Furthermore, the inventors do not rely on idealized antenna models with perfect radiation patterns. Instead, the inventors have adopted a measurement-based approach for characterizing the antenna sectors. The inventors also contrast previous work as they do not rely on advanced antennas or digital signal processing, but instead the solution according to the present invention can use a simple and low-cost multi-sector antennas that can be readily used with regular off-the-shelf IEEE 802.11 hardware.

In the present invention, an optimization framework for topology control in wireless networks, particularly IEEE 802.11 wireless networks, is introduced and a practical and efficient distributed protocol using sectorized antennas is developed. A main distinction between the topology control approach according to the present invention and earlier proposals is that the present invention uses a measurement based approach for topology control using low-cost sectorized antennas that are simple to design and can work with commodity wireless hardware.

A topology control optimization problem is first formulated as a quadratic integer program that activates multiple sectors on each node to minimize overall network interference and thereby maximize capacity. The inventors then introduce a technique to reduce it to an equivalent linear integer program. The resulting linear integer program can be relaxed to obtain bounds on the optimal solution using standard Linear Programming (LP) solvers. The formulation uses physical interference model based on measurements of Received Signal Strength (RSS) values that have been observed to capture the performance of different sector activations well. This formulation also avoids modeling the detailed operation of the IEEE 802.11 MAC protocol which is hard and cannot be easily incorporated in optimization procedures.

The present invention is defined, in its broader sense, as a method for optimizing antenna pattern assignment for a first wireless communication device forming a wireless network with at least one second wireless communication device w, each of said communication device u, w being equipped with a multi-sector antenna, an antenna pattern being a combination of said antenna sectors, said communication devices u, w being adapted for sending a request and for receiving a response using a current antenna pattern assignment, said method comprising a step of:

evaluating by said first communication device u a first value $S^*u$;

sending by said first communication device u to said second communication device w a broadcast request comprising said value $S^*u$;

setting by said first communication device u a first timeout depending on the date of sending the broadcast request;

receiving by said first communication device u, a response to said broadcast request, said response being sent by said second communication device w, said response depending on a second value $S^*w$ evaluated by said second device w;

Switching or not, by said first communication device u, to a new antenna sector assignment depending on said response; characterized in that the first value $S^*u$ is evaluated by minimizing a first local function $S_u$ according to the received signal strength RSS received by said first communication device u having said current antenna pattern assignment and in that the second value $S^*w$ is evaluated by minimizing a second local function $S_w$ according to the received signal strength RSS received by said second communication device w for its own current antenna pattern assignment.

Advantageously, the response received by said first communication device (u) is negative when said second communication device (w) determines that $S^*u \geq S^*w$.

Advantageously, the response received by said first communication device (u) is positive when said second communication device (w) determines that $S^*u < S^*w$.

Advantageously, said step of switching consists in from the current antenna pattern assignment to a new antenna pattern assignment by said first communication device u when the responses received by said first communication device u from said second communication devices w within said first timeout are positive.

Advantageously, it involves a further step of said second communication device w is blocked from modifying its current antenna pattern assignment until either said second timeout expires or when said second communication device w receives a broadcast confirmation from said first communication device u for acknowledging reception of the response sent by said second communication device w.

Advantageously, said first communication device (u) computes an antenna pattern assignment $(x^*_u)$ and corresponding optimal value $S^*_u = S_u(x^*_u)$ that minimizes the function $S_u(x_u)$ given by:

$$S_u(X_u) = \sum_{w:w \in I(u)} RSS_{wux_wx_u} + \sum_{w:u \in I(w)} RSS_{uwx_ux_w}, \quad (13)$$

over all possible antenna pattern assignments $x_u$ of communication device (u) and subject to the constraints $$RSS_{uv00} - RSS_{uvx_ux_v} \leq C_{th}, (u,v) \in E' \quad (14)$$

$$RSS_{vu00} - RSS_{vux_vx_u} \leq C_{th}, (u,v) \in E'$$

where in the above expressions (13) and (14),

E' denotes a set of links (i,j) connecting communication device (i) to communication device (j) in the network over which data is currently sent and I(i) denotes a set of communication devices in the network over that can cause interference at communication device (i)

All communication devices (w) being one-hop interfering neighbor of communication device (u) {w:w∈I(u), u∈I(w)} and all communication devices (v) being one-hop communication neighbors of communication device (u) {v:(u,v)∈E'} keep their respective antenna pattern assignment $(x_w, x_v)$ fixed, Expression $RSS_{ijx_ix_j}$ denotes the Received Signal Strength at communication device (j) over the link (i,j) connecting the communication device (i) and the communication device (j) when said device (i) transmits using antenna pattern assignment $(x_i)$ and said device (j) receives using antenna pattern assignment $(x_j)$, Expression $RSS_{ij00}$ denotes the Received Signal Strength at communication device (j) over link (i,j) when communication device (i) transmits using the omni-directional antenna pattern assignment $x_i=0$ and communication device (j) receives using the omni-directional antenna pattern assignment $x_j=0$, Cth is a threshold parameter, Advantageously, said first communication device u performs an evaluation for $S^*_u$ which is identical to the evaluation performed by said second communication device w for evaluating $S^*_w$.

Advantageously, said first communication device u sends the broadcast request using omni-directional antenna pattern.

Advantageously, said first communication device u sends a confirmation broadcast using omni-directional antenna pattern to second communication devices w and selects $x^*_u$ as new antenna pattern assignment.

Advantageously, when said first communication device u receives a positive response from said second communication device w, said second communication device w sets a second timeout and in that when either second timeout expires or when said second communication device w receives said broadcast confirmation packet from said first communication device u, said second communication device w is allowed to adjust its current antenna pattern assignment.

The wireless network comprises a plurality of communication devices.

Advantageously, each communication device of said plurality communication devices acts successively as the first communication device u and in that the broadcast request is sent to all other communication devices of said plurality of communication devices.

The advantages provided by the present invention are the following:

The present invention solves the problem of interference minimization in a wireless network using sectorized antennas.

The proposed topology control protocol does not require modifications to the existing protocols or access to the lower layers of the MAC protocol stack. It requires RSS measurements which are already provided by commodity hardware. It also requires control logic that switches each node to transmit or receive to a particular antenna sector combination. Since topology control operates at a longer time scale than the MAC protocol operation, this control logic can be implemented at higher layers without modifying the MAC protocol. Finally, the topology protocol control messages can be implemented at a higher layer than the MAC protocol using broadcast or unicast network layer packets. Therefore, the proposed protocol can be widely deployed with minimal effort on any existing wireless network.

The proposed protocol is distributed and is applicable to either multi-hop wireless networks or single-hop wireless networks (WLANs). The protocol can be run in parallel with link selection mechanisms (routing mechanisms in multi-hop wireless networks or association mechanisms in WLANs).

Among several applications, the proposed protocol can be applied to interference mitigation, capacity increase, and topology optimizations of wireless networks.

BRIEF DESCRIPTION OF THE DRAWINGS

The following detailed description will be better understood with the drawings, in which.

DETAILED DESCRIPTION OF THE EMBODIMENTS OF THE INVENTION

Figure 1:
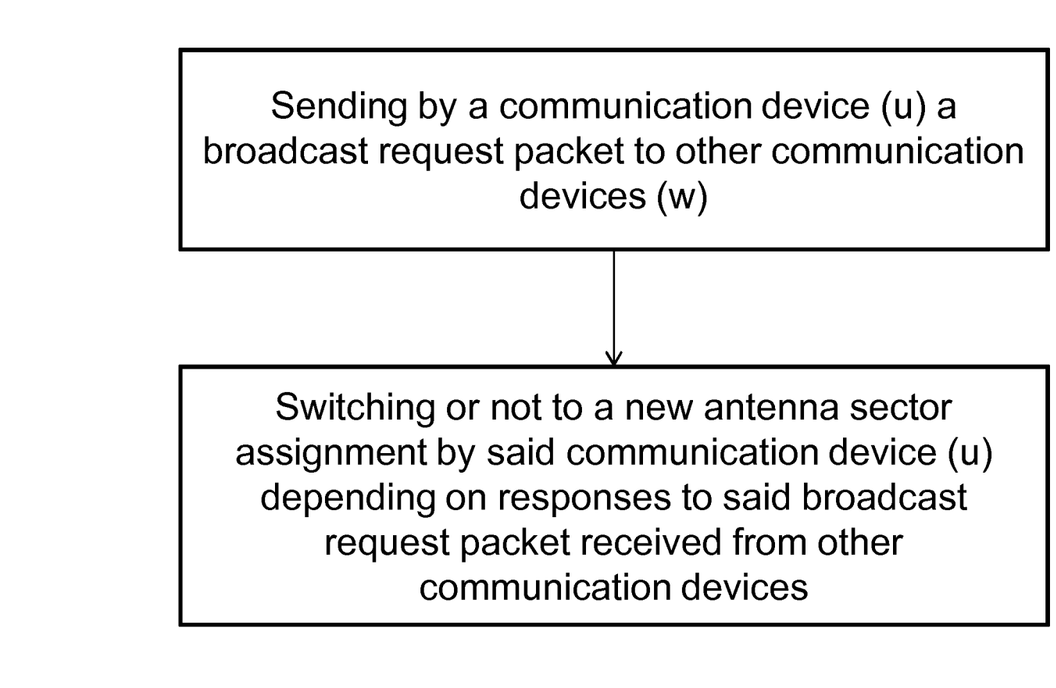
FIG. 1 is a flow-chart representing the method according to the present invention.

There are two parts in the invention:
the formulation of the topology control optimization problem and a Linear Programming (LP) technique to obtain a lower bound of the optimal solution; and
the distributed topology control protocol that attempts to solve this optimization problem in an iterative manner.

1. Model and Optimization Problem Formulation

In this section, the system model is presented and the topology control problem is formulated using multi-sector antennas as a combinatorial optimization problem.

1.1 Network Model

The network is represented by a directed graph $G=(V,E)$ where V is a set of n nodes in the network and $E \subseteq V^2$ is a set of links between pairs of nodes. More precisely, the link $(u,v) \in E$ exists between node pair u and v, if data can be delivered from u to v with a delivery ratio above a threshold ($PRR_{thresh}$) when the link operates at the lowest bit rate supported by the underlying physical layer. This ensures that each link in the network can carry data using at least one of the possible bit rates.

A link $(u,v) \in E$ is considered as active, if it is selected to carry data traffic. Link selection is performed by a network layer protocol, such as the association mechanism between an AP and client in a WLAN, or a multi-hop routing protocol in a mesh network. In this invention, we do not consider the link selection procedure itself, but simply assume the presence of such a mechanism. Let $E' \subseteq E$ denote the set of active links in the network. The set E' is an input parameter to our topology control optimization problem.

1.2 Antenna Model

We assume each node in the network is equipped with a multi-sector antenna consisting of s sectors. An antenna pattern is formed by activating any combination of these s sectors.

The total number of antenna patterns that can be formed is $k \leq 2^s - 1$.

Let $K = \{0, 1, \ldots, k-1\}$ denote the set of possible antenna patterns available at each node. Here antenna pattern 0 denotes the omni-directional mode where all s sectors are enabled. Let $G^{i\theta}$ denote the gain of antenna (in dBi) when using antenna pattern i along the direction $\theta$. Under ideal conditions, in the absence of multi-path reflection, the received signal strength (RSS) at a node v from a node u when node u is using antenna pattern i to transmit packets and node v is using antenna pattern j to receive the packets is given by, $$RSS_{uvij} = \frac{P_u^t G_u^{i\theta_{uv}} G_v^{j\theta_{vu}}}{d_{uv}^\alpha}$$

where $P_u^t$ is the transmit power at node u, $\theta_{uv}$ is the direction from node u to v, $d_{uv}$ is the distance between u and v, and $\alpha$ is the path loss coefficient. In practice, RSS is an estimate of the signal energy level at the receiver during packet reception and is measured when receiving the PLCP packet header. Whenever a new antenna pattern is selected, the antenna gain changes with a resulting change in the energy level at the receiver. Thus RSS is the fundamental physical layer quantity affected by this change. Using commodity IEEE 802.11 wireless cards, the RSS of any link (u,v) can be directly obtained from protocol header field (e.g., the Prism monitoring header) added to each received packet. It has been shown in previous studies that RSS correlates well with higher layer metrics such as packet delivery ratio and data rate of a link. RSS also forms the basis of the physical interference model. In the next section, we discuss how to use link RSS to model interference in the network and define the objective function of our topology control optimization problem.

1.3. Interference Model and Objective Function

The obvious approach to topology control is to directly maximize network capacity. In wireless networks that use Time Division Multiple Access (TDMA) MAC protocols it is possible to formulate an optimization problem that performs capacity maximization. However, we are primarily concerned with topology control in IEEE 802.11 networks that use Carrier Sense Multiple Access (CSMA) MAC protocol. In contrast to TDMA, modeling network capacity of a CSMA network is difficult. Recently, several measurement-based capacity models for CSMA networks have been proposed [9], [13]. However, these models are complex and are not easily incorporated in optimization frameworks. Our approach to topology control is to minimize the aggregate interference in the network. This approach has been used [8] as an indirect way to optimize network capacity. In CSMA based wireless networks, a transmission suffers from interference both at the sender and receiver side. Consider a transmission from node u to node v. At the sender side, u senses the medium free only when the following condition is satisfied.

$$\sum_{w \in I(u)} RSS_{wu} \le CS_{thres} \quad (1)$$

where $RSS_{wu}$ is the received signal strength at node u from node w, I(u) is the set of nodes that can cause interference at node u (denoted as the interference set) and $CS_{thres}$ is the carrier sense threshold. On the receiver side, a packet transmitted from v to u is successfully received only if the following condition is satisfied.

$$\frac{RSS_{vu}}{\sum_{w \in I(u)} RSS_{wu} + N} \ge \beta \quad (2)$$

Here N is the background noise and $\beta$ is the receive threshold. We define the interference set I(u) for a node u as follows. A node $w \in I(u)$ iff $(u,w)(w,u) \notin E'$. This implies all nodes in the network, that do not transmit to or receive from node u according to the links selected by the network layer protocol are part of the interference set. The interference at node u then is $$\sum_{w \in I(u)} RSS_{wu}.$$

This affects node u when it is either the sender node of a link (Equation 1) or the receiver node of a link (Equation 2).

The focus of our approach is to minimize the aggregate interference in the network, which is defined as follows:

$$\sum_{u \in V} \sum_{w \in I(u)} RSS_{uw} = \sum_{(w,u) \notin E'} RSS_{wu} \quad (3)$$

1.4. Optimization Framework

Informally, our approach to topology control is to minimize the aggregate interference in the network as defined in Equation (3) by assigning appropriate antenna patterns to each node subject to a connectivity constraint. The connectivity constraint is defined for each link in E' (the links that carry data traffic) as follows. For each link (u, v) in the set E', the RSS of that link after the antenna pattern assignment should be comparable (within a threshold of a few dB) to the RSS of the link when both node u and node v use omni-directional mode. We define the optimization problem formally below.

Let $X_{ui}$ be a decision variable that denotes whether or not antenna pattern i is assigned to node u. $X_{ui}=1$ if antenna pattern i is assigned to node u and $X_{ui}=0$ otherwise. For each link (u,v) in the set E', let $C_{uvij}$ denote whether assigning antenna pattern i to node u and j to node v satisfies the connectivity constraint.

$$C_{uvij} = \begin{cases} 1, & \text{if } RSS_{uv00} - RSS_{uvij} < C_{th} \\ 0, & \text{otherwise} \end{cases}$$

where $RSS_{uv00}$ denotes the RSS of link (u, v) when both nodes use omni-directional mode and $RSS_{uvij}$ denotes the RSS when node u uses antenna pattern i and node v uses antenna pattern j. $C_{th}$ is a threshold chosen to be of the order of a few dB. Choosing antenna patterns i and j such that $C_{uvij}=1$ ensures that the data rate of the link (u,v) does not suffer because of antenna pattern assignment.

Our topology control problem, named OPT_TOPOCONTROL is defined as follows:

OPT_TOPOCONTROL: (4)

Minimize $\sum_{(w,u) \notin E'} \sum_{i,j \in K} RSS_{wuij} X_{wi} X_{uj}$

Subject to: $\sum_{i \in K} X_{ui} = 1, \forall u \in V$ $$\sum_{(w,u) \notin E} \sum_{i,j \in K} C_{uvij} X_{ui} X_{vj} \ge 1, \forall (u, v) \in E' \quad (5)$$

$$X_{ui} \in \{0, 1\}, \forall u \in V, \forall i \in K \quad (6)$$

Equation (4) ensures that each node in the network is assigned exactly one antenna pattern. Equation (5) ensures that the RSS, using the assigned antenna patterns, of each link carrying data traffic is within $C_{th}$ of the RSS when using omni-modes. Finally, Equation (6), ensures that the $X_{ui}$'s take values 0 or 1.

The above optimization problem is a quadratically constrained quadratic optimization problem and is conjectured to be NP-hard. In the next section, we reduce this problem to an integer linear program and then relax it to a linear program to obtain a lower bound on the optimal solution.

1.5. Linear Program Formulation

Our goal in this section is to replace the quadratic objective and quadratic constraint in our OPT_TOPOCONTROL formulation with a linear objective and constraint. Note that the objective function, only includes links that do not belong to the set E' and constraint (5) only applies to links only belonging to set E'. These two sets of links are disjoint. We replace the product $X_{ui} X_{vj}$ with a new variable $Z_{uvij}$ in equation (5) and introduce two new constraints, $$Z_{uvij} \le X_{ui}, \forall u,v \in E', \forall i,j \in K \quad (7)$$

$$Z_{uvij} \le X_{vj}, \forall u,v \in E', \forall i,j \in K \quad (8)$$

In the original optimization formulation, $X_{ui} X_{vj}=1$ when both $X_{ui}$ and $X_{vj}$ are 1 and 0 otherwise. Equations (7) and (8) ensure that $Z_{uvij}$ is less than both $X_{ui}$ and $X_{vj}$. So except for the case when both $X_{ui}$ and $X_{vj}$ are 1, $Z_{uvij}$ must be 0. In the remaining case, it can either be 0 or 1. Since the left side of equation (5) should be greater than 1, at least one of the $Z_{uvij}$ will be forced to be 1. This ensures that the connectivity constraint is satisfied for every link carrying data. We replace the product $X_{ui}X_{vj}$ by the variable $Y_{uvij}$ in the objective function and add the following additional constraints.

$$Y_{uvij} \geq X_{ui} + X_{vj} - 1, \forall u,v \notin E', \forall i,j \in K \quad (9)$$

In the original optimization formulation, $X_{ui}X_{vj}=1$ in the objective function when both $X_{ui}$ and $X_{vj}$ are 1 and 0 otherwise. Equation (9) ensures that when both $X_{ui}$ and $X_{vj}$ are 1, then $Y_{uvij}$ is forced to be 1. In the remaining case, $Y_{uvij}$ can either be 0 or 1. Since the optimization problem aims to minimize the objective, when given a choice of 0 or 1 to the variable $Y_{uvij}$, 0 is chosen. Using the above mentioned reductions, the original quadratically constraint quadratic optimization problem transforms into the following integer linear program.

$$\text{minimize} \sum_{(w,u) \notin E'} \sum_{i,j \in K} RSS_{wuij} Y_{wuij}$$

$$\text{Subject to: } \sum_{i \in K} X_{ui} = 1, \forall u \in V$$

$$\sum_{i,j \in K} C_{uvij} Z_{uvij} \geq 1, \forall (u,v) \in E'$$

$$Y_{uvij} \geq X_{ui} + X_{vj} - 1, \forall (u,v) \notin E', \forall i,j \in K$$

$$Z_{uvij} \leq X_{ui}, \forall (u,v) \in E', \forall i,j \in K$$

$$Z_{uvij} \leq X_{vj}, \forall (u,v) \in E', \forall i,j \in K$$

$$X_{ui} \in \{0,1\}, \forall u \in V, \forall i \in K$$

$$Y_{uvij} \in \{0,1\}, \forall u, v \notin E', \forall i,j \in K$$

$$Z_{uvij} \in \{0,1\}, \forall u, v \in E', \forall i,j \in K$$

Therefore, by relaxing the integrality constraints in the above integer linear program using standard solvers such as CPLEX [2], we can obtain lower bounds on the optimal solution of the original topology control optimization problem (OPT_TOPOCONTROL) in polynomial time.

2. Greedy Distributed Topology Control Protocol

We now present a distributed topology control protocol that aims to solve the topology control optimization problem OPT_TOPOCONTROL. This protocol works transparently with existing link selection protocols (routing protocols such as AODV and DSR in the case of mesh networks or association mechanisms in case of WLANs) and can be readily implemented on top of the IEEE 802.11 MAC protocol using commodity IEEE 802.11 wireless hardware. The protocol uses as input the active links E' from the link selection protocol and the $RSS_{uvij}$ values from a separate distributed measurement protocol that operates simultaneously. In order to better understand the topology control protocol operation, we first present the algorithm that contains the main idea behind it.

2.1. Distributed Iterative Algorithm

The topology control optimization problem is extremely complex to solve even with centralized information. We present a distributed heuristic algorithm that aims to iteratively solve this problem using only local information. Consider an arbitrary assignment where $x_u \in K$ denotes the antenna pattern assigned to each node u in the network. For this assignment, the objective function is given by:

$$\sum_{(w,u) \notin E'} RSS_{wux_w x_u} \quad (10)$$

This objective function can also be written as $$\sum_{u \in V} S_u,$$

where:

$$S_u \sum_{w: w \in I(u)} RSS_{wux_w x_u} + \sum_{w: u \in I(w)} RSS_{uwx_u x_w} \quad (11)$$

The first term of $S_u$ corresponds to the interference other nodes cause to node u and the second term corresponds to the interference node u causes to other nodes. The iterative algorithm aims to minimize the objective function by iterative minimization of each $S_u$.

The algorithm operates as follows. Let $(x_u^{(n)}, \forall u \in V)$ denote the antenna pattern assignments at iteration n. At each iteration, a node u is selected to modify its antenna pattern assignment, while the rest of the nodes in the network keep their assignments fixed. The node selection order can be with respect to different criteria but for simplicity we assume it is arbitrary.

First, node u performs a local computation called COMPUTE_OWN_BEST_SECTOR. More specifically, node u computes the sector $x^*_u$ that minimizes $S_u(x_u)$ in equation (11) assuming that all its one-hop neighbors $\{w:w \in I(u), u \in I(w)\}$ and $\{v:(u,v) \in E'\}$ keep their antenna pattern assignments $x_w^{(n)}$ and $x_v^{(n)}$ fixed, subject to the constraints $$RSS_{uvx^*_u x_v}(n) - RSS_{uv00} \leq C_{th}, (u,v) \in E'$$

$$RSS_{vux_v x^*_u}(n) - RSS_{uv00} \leq C_{th}, (u,v) \in E'$$

This minimization includes (i) selecting all antenna patterns $x_u$ that satisfy connectivity constraints of links (u,v) in the set E', i.e. $C_{uvx_u x_v}=1$, and (ii) for these $x_u$, compute and compare the corresponding values for $S_u$ based on Equation (11). Second, node u selects $x^*_u$ as its new antenna pattern assignment.

It is easy to show that the above algorithm is guaranteed to converge to a local minimum of the objective function of Equation (10), after a finite number of iterations, regardless of initial state. The reason is that, during each iteration the objective function decreases and there is a finite number of antenna pattern combinations in the network.

2.2. Greedy Distributed Protocol

We now provide a distributed protocol that realizes a greedy version of the distributed iterative algorithm. The protocol is executed continuously and asynchronously at each node u and relies only on local computations and one-hop message exchanges. It operates on top of the IEEE 802.11 MAC protocol and its messages are implemented with broadcast or unicast network layer packets. As described later, all control messages of the protocol are sent using the omnidirectional antenna pattern and at the lowest data rate (6 Mbps in our IEEE 802.11a implementation) to increase coverage and reliability, respectively. To further increase coverage and reliability, the control messages can be sent on the same channel as data packets, either using standard time synchronization or rendezvous methods between neighbor nodes or using a separate radio and frequency channel.

Each node u maintains a table for each neighbor w that contains (i) current antenna pattern $x_w$ and (ii) $RSS_{wux_vx_u}$ values for all antenna sectors on link (u,w), measured by a separate measurement protocol. Each node u sends a broadcast packet at random intervals containing its current antenna pattern assignment $x_u$ so that neighbors update their tables.

Each node u is in two states with respect to its participation to the topology control protocol. During an antenna pattern modification it is BUSY and transmits using the omni-directional antenna pattern, otherwise it is FREE and transmits using its assigned antenna pattern $x_u$.

While in the BUSY state, a node attempts to modify its antenna pattern assignment. Since the attempts among nodes are not synchronized, multiple nodes may attempt to modify their antenna patterns simultaneously. Recall that each iteration of the distributed algorithm requires a node to modify its assignment while its neighbors keep their assignments fixed. This issue is addressed using a distributed locking mechanism described in steps 1-4 below.

We now describe the protocol actions during the attempt of node u. In the following description, when a node u (or w) becomes BUSY, it performs the following actions: (i) it switches to BUSY state, (ii) switches to omni-antenna pattern 0, and (iii) sets a timeout equal to BUSY TIMEOUT which is the maximum duration nodes participate in each attempt. When a node u (or w) aborts, it performs the following actions: (i) it switches to FREE state and (ii) returns to its antenna pattern assignment $x_u$ (or $x_w$).

Step 1. Node u first becomes BUSY and then minimizes $S_u$ in Equation (11) based on the $x_w$ values in its local table and obtains the minimum value $S^*_u$ and the corresponding assignment $x^*_u$. Then, it sends a broadcast TOPO REQ packet that contains $S^*_u$. It also sets a timeout TOPO REQ TIMEOUT during which it waits for TOPO REQ ACK responses from all neighbors. The TOPO REQ packet requests from neighbors to fix their antenna pattern assignments.

Step 2. When a node w receives a TOPO REQ packet from u, it returns a TOPO REQ NACK packet to u if it is BUSY or if $S^*_u \geq S^*_w$. Otherwise, if node w is FREE and $S^*_u < S^*_w$, it becomes BUSY and returns a TOPO REQ ACK packet to u. The comparison between $S^*_w$ and $S^*_u$ serves both to break ties and to implement a greedy iteration where the node with the minimum $S^*_u$ within its one-hop neighborhood modifies its sector assignment. This results in a maximum reduction in the global objective within each one-hop neighborhood.

Step 3. If node u receives at least one TOPO REQ NACK or its TOPO REQ TIMEOUT expires, it broadcasts a TOPO CANCEL packet and aborts. Otherwise, if it receives TOPO REQ ACK from all neighbors within TOPO REQ TIMEOUT, it broadcasts a TOPO CONFIRM packet. Then, it switches to FREE state and switches to the new antenna pattern assignment $x^*_u$.

Step 4. If node w receives a TOPO CONFIRM packet assignment from u, it switches to FREE state and switches back to its antenna pattern assignment $x_w$. At this point the antenna pattern reassignment at node u is complete. If during the above steps the BUSY TIMEOUT of any BUSY node expires, this node aborts.

The above specification, examples and drawings provide a complete description of the method according to the present invention. Since many embodiments of the invention can be made without departing from the spirit and scope of the invention, the invention resides in the claims herein after appended.

The invention claimed is:

1. A method for antenna pattern assignment for a communication device equipped with a multi-sector antenna including multiple sectors, the multi-sector antenna configured to allow the multi-sector antenna to be used with a plurality of antenna pattern assignments, the method comprising:
    sending, by the communication device, a broadcast request using an antenna pattern assignment of the plurality of antenna pattern assignments including one or more sectors of the multiple sectors;
    receiving, by the communication device, a response to the broadcast request; and
    switching, by the communication device, to a new antenna pattern assignment of the plurality of antenna pattern assignments based on the response,
    setting, by the communication device, a timeout depending on a date of sending the broadcast request,
    wherein the switching comprises switching, by the communication device, to the new antenna pattern assignment if the response received by the communication device within the timeout is positive.

2. The method according to claim 1, wherein the communication device is further equipped with a receiver coupled to the multi-sector antenna, the receiver configured to control the sending, the receiving, and the switching.

3. The method according to claim 1, wherein the broadcast request is sent to a second communication device, and the response is received from the second communication device.

4. The method according to claim 3, wherein receiving the response comprises receiving a response from the second communication device that is based on a signal strength received at the second communication device and on a signal strength received at the communication device.

5. The method according to claim 1, wherein the broadcast request is sent over a wireless network, and the response is received over the wireless network.

6. The method according to claim 1, wherein the broadcast request includes a first value.

7. The method according to claim 6, wherein the first value is determined based on a received signal strength received by the communication device using the antenna pattern assignment.

8. The method according to claim 1, wherein the switching to the new antenna pattern assignment by the communication device is carried out if the response is a positive response, indicating that the antenna pattern assignment should be switched.

9. A method for antenna pattern assignment for a communication device equipped with a multi-sector antenna including multiple sectors, the multi-sector antenna configured to allow the multi-sector antenna to be used with a plurality of antenna pattern assignments, the method comprising:
    receiving, by the communication device using an antenna pattern assignment of the plurality of antenna pattern assignments including one or more sectors of the multiple sectors, a broadcast request comprising a first value;
    determining, by the communication device, a second value based on a received signal strength received by the communication device using the antenna pattern assignment;
    determining, by the communication device, a response to the broadcast request based on a comparison of the first value and the second value; and sending, by the communication device, the response,
wherein the first value and the second value are representative of an amount of interference at the communication device.

10. The method according to claim 9, wherein determining the response comprises determining a response indicating whether the antenna pattern assignment should be switched.

11. The method according to claim 9, wherein:
receiving the broadcast request comprises receiving the broadcast request from a separate communication device, and
the first value is based on a signal strength received at the separate communication device.

12. The method according to claim 9, wherein the response sent by the communication device is positive if the communication device determines that the first value is less than the second value.

13. The method according to claim 12, wherein:
when the response sent by the communication device is positive, the communication device sets a timeout, and
the communication device is allowed to adjust said antenna pattern assignment after having sent said response and set said timeout, only when one of two events, including an expiration of the timeout and a reception of a broadcast confirmation packet corresponding to the response sent by the communication device, happens.

14. The method according to claim 9, further comprising:
sending, by the communication device, a separate broadcast request using a current antenna pattern assignment of the plurality of antenna pattern assignments;
receiving, by the communication device, a separate response to the separate broadcast request; and
switching, by the communication device, to a new antenna pattern assignment of the plurality of antenna pattern assignments based on the received separate response.

15. A communication device comprising:
a multi-sector antenna including multiple sectors, the multi-sector antenna configured to allow the multi-sector antenna to be used with a plurality of antenna pattern assignments, wherein the communication device is configured to perform at least the following:
sending a broadcast request using an antenna pattern assignment of the plurality of antenna pattern assignments including one or more sectors of the multiple sectors,
receiving a response to the broadcast request, and
switching to a new antenna pattern assignment of the plurality of antenna pattern assignments based on the response, wherein the communication device is further configured to:
set a timeout depending on a date of sending the broadcast request, and
switch to the new antenna pattern assignment if the response received by the communication device within the timeout is positive.

16. The communication device according to claim 15, further comprising a receiver coupled to the multi-sector antenna, the receiver configured to control the sending, the receiving, and the switching.

17. The communication device according to claim 15 wherein:
the communication device is configured to send the broadcast request to a second communication device, and
the communication device is configured to receive the response from the second communication device.

18. The communication device according to claim 17, wherein receiving the response comprises receiving a response from the second communication device that is based on a signal strength received at the second communication device and on a signal strength received at the communication device.

19. The communication device according to claim 15 wherein:
the communication device is configured to send the broadcast request over a wireless network, and
the communication device is configured to receive the response over the wireless network.

20. The communication device according to claim 15 wherein the communication device is configured to include a first value in the broadcast request.

21. The communication device according to claim 20, wherein the communication device is further configured to determine the first value based on a received signal strength received by the communication device using the antenna pattern assignment.

22. The communication device according to claim 15, wherein the communication device is configured to switch to the new antenna pattern assignment if the response is a positive response, indicating that the antenna pattern assignment should be switched.

23. A communication device comprising:
a multi-sector antenna including multiple sectors, the multi-sector antenna configured to allow the multi-sector antenna to be used with a plurality of antenna pattern assignments, wherein the communication device is configured to perform at least the following:
receiving a broadcast request using an antenna pattern assignment of the plurality of antenna pattern assignments including one or more sectors of the multiple sectors, the broadcast request comprising a first value;
determining a second value based on a received signal strength received by the communication device using the antenna pattern assignment;
determining a response to the broadcast request based on a comparison of the first value and the second value; and
sending the response,
wherein the first value and the second value are representative of an amount of interference at the communication device.

24. The communication device according to claim 23, wherein determining the response comprises determining a response indicating whether the antenna pattern assignment should be switched.

25. The communication device according to claim 23, wherein:
receiving the broadcast request comprises receiving the broadcast request from a separate communication device, and
the first value is based on a signal strength received at the separate communication device.

26. The communication device according to claim 23, wherein the response sent by the communication device is positive if the communication device determines that the first value is less than the second value.

27. The communication device according to claim 26, wherein the communication device is further configured to set a timeout when the response sent by the communication device is positive, and to be allowed to adjust said antenna pattern assignment after having sent said response and set said timeout, only when one of two events, including an expiration of the timeout and a reception of a broadcast confirmation packet corresponding to the response sent by the communication device, happens.

28. The communication device according to claim 23, wherein the communication device is further configured to perform at least the following:
- sending, by the communication device, a separate broadcast request using a current antenna pattern assignment of the plurality of antenna pattern assignments;
- receiving, by the communication device, a separate response to the separate broadcast request; and
- switching, by the communication device, to a new antenna pattern assignment of the plurality of antenna pattern assignments based on the received separate response.

\* \* \* \* \*